United States Patent Office 3,445,382
Patented May 20, 1969

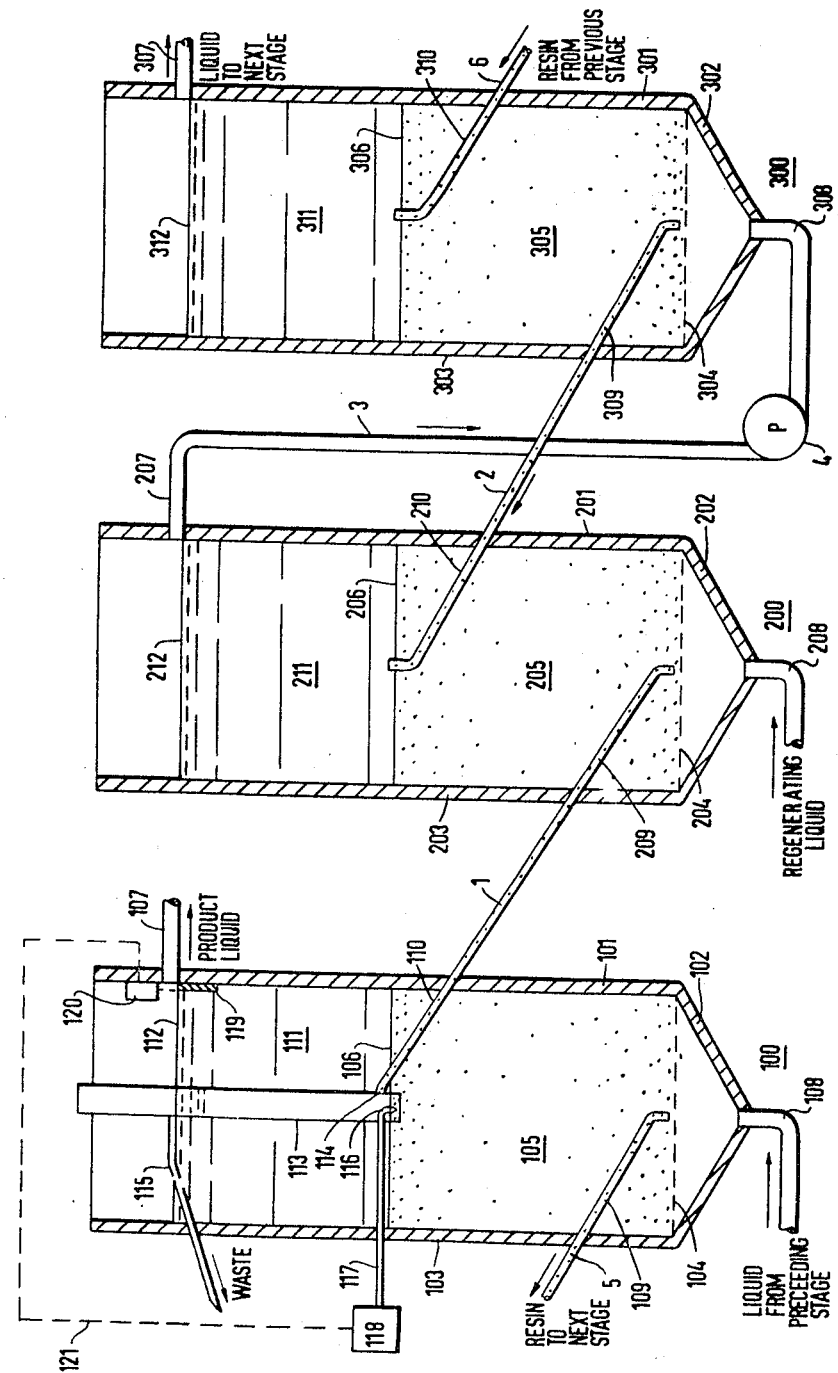

3,445,382
CONTINUOUS MULTISTAGE ION EXCHANGE
METHOD AND APPARATUS
Peter Frederick Wace, Oxford, England, assignor to
United Kingdom Atomic Energy Authority, London, England
Filed Feb. 14, 1966, Ser. No. 527,117
Claims priority, application Great Britain, Feb. 18, 1965,
7,087/65
Int. Cl. C02b 1/16; B01j 1/06; B01d 15/04
U.S. Cl. 210—24                                    11 Claims

ABSTRACT OF THE DISCLOSURE

A multistage ion exchange system using a plurality of countercurrent ion exchange columns each containing a fluidized bed. Successive columns are interconnected by narrow tubes each of which extends from near the bottom of the bed of a stage to a position slightly above the top of the bed in a succeeding stage to transfer the exchange resin from one stage to a succeeding stage.

---

The present invention relates to apparatus for, and methods of, effecting ion exchange processes.

Using an ion exchange technique it is possible to reduce the concentration of an ionic species in a solution considerably by the exchange of one type of ion for another type of ion, for example, in softening water using an ion exchange technique, sodium ions replace the calcium and other ions which cause the hardness in the water. It has hitherto usually been the practice in effecting ion exchange to pass the liquid to be treated through a column containing a bed of particles of a suitable ion-exchange material (the term "resin" being used hereinafter to include all particulate ion-exchange materials). This process is however a batch process since it is necessary to stop the treatment of the liquid and regenerate the resin from time to time when its exchange capacity is exhausted. It is therefore desirable to effect ion exchange on a continuous basis, this most conveniently being effected by causing the resin to move counter current to the liquid being treated.

It is the object of the present invention to provide a new or improved apparatus for, and method of, effecting a continuous ion exchange process.

According to the present invention there is provided a single stage for an ion exchange apparatus wherein a resin moves countercurrent to a liquid flow, such stage comprising a column adapted to contain a resin bed, a liquid inlet means at the bottom of the column, a liquid outlet means in the upper portion of the column, a narrow resin discharge tube located within the column extending upwardly from near the base of the column and passing out of the column at a position below the top of a fluidised resin bed contained within the column, and resin inlet means in the form of a tube terminating slightly above the top of the resin bed.

A suitable pump means may conveniently be connected to the liquid inlet means.

Very conveniently a resin supporting mesh is located in the lower portion of the column. It will be appreciated that the mesh size will be less than the size of resin particles forming a resin bed within the column.

As will be discussed in some more detail hereafter, the functioning of the present invention relies on a wall effect which is experienced when a bed of particles is fluidised in a narrow tube. This wall effect produces an expansion of the bed in the narrow tube relative to that in a wider column. To obtain a satisfactory expansion in the present invention it is preferred that the resin discharge tube and the tube forming the resin inlet means should have an internal diameter 5–10 times the mean size of the resin particles in the resin bed whilst the column has an internal diameter of at least 100 times the mean size of the resin particles.

It will be realised that the single stage of this invention will be incorporated into a multistage ion exchange apparatus and such multistage ion exchange apparatus may comprise a plurality of single stages in accordance with the invention wherein the resin discharge tube of one stage is connected to the resin inlet means of a preceding adjacent stage and the liquid outlet means of said one stage is connected to the liquid inlet means of a subsequent adjacent stage.

More specifically, the invention provides apparatus for effecting a continuous ion exchange process including first and last stages each such stage comprising an ion exchange column having at its base a liquid inlet means and in its upper portion a liquid outlet means, at least one narrow resin discharge tube which passes upwardly from near the base of the column and out of the column at a position below the upper surface of a resin bed contained in the column and at least one resin inlet means passing in an upwardly direction into the column and opening just above the upper surface of the resin bed, wherein such apparatus also includes means connecting the liquid inlet means of the first stage to a supply of a suitable liquid, means connecting the liquid outlet means of the first stage to the liquid inlet means of the last stage, means connecting the resin discharge tube of the first stage to a resin container, means connecting the resin inlet means of the first stage to the resin discharge tube of the last stage, means connecting the liquid outlet means of the last stage to a liquid container and means connecting the resin inlet means of the last stage to a resin supply vessel.

Preferably each resin discharge tube and each resin inlet means has an internal diameter 5–10 times the mean size of resin particles in the apparatus and the internal diameter of each column is at least 100 times the mean size of the resin particles.

The first and last stages may be connected directly through suitable conduit means to give a two stage apparatus or may be connected indirectly through one or more intermediate stages to give a multistage apparatus.

In such multi-stage apparatus, the first and last stages are connected through at least one intermediate stage, each such intermediate stage is substantially the same as the first and last stages, the liquid inlet means and the resin discharge tube of any such intermediate stage are connected respectively to the liquid outlet means and the resin inlet means of the next preceeding stage and the liquid outlet means and the resin inlet means of said intermediate stage are connected respectively to the liquid inlet means and the resin discharge tube of the next subsequent stage.

It should be appreciated that the terms "first," "last," "preceding" and "subsequent" refer to the liquid flow through the apparatus.

The single stages of the present invention may be combined to give an apparatus including a closed cycle for resin flow in which the resin may be circulated through a liquid treatment section, on to a resin regenerating section and then back to the liquid treatment section. Each of these sections will be substantially the same as the apparatus hereinbefore described and having the resin discharge tube of the first stage of the resin regenerating section connected to the resin inlet means of the last stage of the liquid treatment section and the resin inlet means of the last stage of the resin regenerating section connected to the resin discharge tube of the first stage of the liquid treatment section.

The present invention also provides a process for ion exchange comprising setting up a plurality of ion exchange columns each containing a resin bed, passing a liquid through each such column in turn at a rate sufficient to cause fluidisation of the resin bed therein, simultaneously effecting fluidisation and expansion of a restricted portion of the resin bed in each column and effecting transfer of such restricted portion of the resin bed to the resin bed of the adjacent column in counter current to the liquid flow.

More specifically there is provided a method of operating a single stage in accordance with the present invention wherein a bed of resin particles is contained in the column, a liquid is passed into the column through the liquid inlet means at a rate which is sufficient just to cause fluidisation of the resin bed in the column and fluidisation and expansion of the resin in the resin discharge tube, whereby resin passes through said tube from the bottom of the resin bed and is discharged from the column, introducing resin to the top of the fluidised resin bed through the resin inlet means and withdrawing liquid from the column through the liquid outlet means.

Further, there is provided a method of continuous ion exchange using the multistage apparatus hereinbefore described, such method comprising passing a liquid into the first stage and each subsequent stage at a rate which is sufficient just to cause fluidisation of the resin bed in each of the ion exchange columns, whereby in the narrow resin discharge tubes, fluidisation and expansion of the resin bed occurs and causes the bed in the tube to expand above the upper end of the resin inlet tube in any next preceding column which is connected to the said resin discharge tube to give transfer of resin from the base of the resin bed in any of the said columns to the top of the resin bed in any next preceding column.

In using the multistage apparatus in the manner described, it will be found that the transfer of resin will be accompanied by a transfer of liquid and it may be desirable to prevent the transferred liquid from mixing with the liquid passing out from the top of the resin bed in any next preceding stage. Thus, any stage of the apparatus may be provided with flow control means effective to prevent the mixing of the liquid leaving the top of the resin bed with the transfer liquid from the subsequent stage.

In apparatus having a closed cycle for resin flow, it is very desirable to include a flow control means in the last stage of both the liquid treatment and the resin regeneration sections.

One type of flow control means which may be used comprises a flow sensitive device located in the region of the upper surface of the fluidised resin bed within the ion exchange column, said flow sensitive device being located in an essentially vertical tube to which is connected the end of the resin inlet means, the lower end of the said essentially vertical tube being below the upper surface of the resin bed and the upper end passing out from the top of the ion exchange column, a liquid outflow means in said vertical tube, such liquid outflow means being located at the same level as the liquid outlet means from the ion exchange column, a variable flow restricting means positioned at the liquid outlet means from the ion exchange column, said flow restricting means being operatively connected to said flow sensitive device whereby an upward flow of liquid is maintained in the said vertical tube.

The flow sensitive device is conveniently a pitot and the flow restricting means may be a variable weir. The height of the weir is then set in dependence on the net liquid flow at the resin bed surface as measured by the pitot. To prevent mixing, the control system is adjusted to provide a small liquid upflow at the resin surface.

As previously mentioned, the present invention depends on a wall effect which is experienced when a bed is fluidised in a narrow tube, such a tube conveniently having an internal diameter which is about 5–10 times the mean size of the particles forming the resin bed. This wall effect results in fluidisation and expansion of the bed occurring within the tube at a liquid flow rate which is sufficient only to cause fluidisation (and much less expansion) in a wide column, that is one having a diameter of at least 100 times or the mean size of the particles of the bed in which no such wall effect occurs.

The extent of the wall effect is dependent on the ratio of the mean diameter of the particles to the internal diameter of the tube and increases as this ratio approaches unity. It will be appreciated that the wall effect occurs in containing vessels of all diameters but that the expansion resulting from the wall effect is substantially only in tubes of narrow diameter.

Thus, if a suitable narrow tube is placed in an ion exchange column containing a resin bed and the upper end of the tube extends slightly above the level of the resin bed, then on passing a liquid through the bed at a rate sufficient to cause fluidisation thereof with little expansion the portion of the bed within the tube will undergo greater expansion and particles of the resin will pass out from the top of the tube and fall onto the upper surface of the resin bed in the column. Thus, the resin is transferred from the bottom of the resin bed to the top of the bed.

In the present invention this effect is used to give transfer of resin from the bottom of one bed to the top of another. It should be noted that the expansion effect is in a vertical plane and thus although the resin discharge tubes, the tubes forming the resin inlet means, and the tubes connecting them are not vertical, but inclined at an angle, the expansion effect is nevertheless observed.

To ensure that transfer of the resin is uniform throughout the horizonal cross-section of the column, it is to be preferred that several resin discharge tubes, and correspondingly resin inlet means and connecting tubes, are provided, distributed uniformly through the cross-section of the column.

The liquid being passed through the resin bed may be for treatment by the bed or for regeneration of the bed, and it is convenient to combine both processes together in an apparatus having a closed cycle with respect to the resin as hereinbefore described. In one section of the cycle the resin is being used for treatment of a liquid and in the other section the resin itself is being treated to regenerate it. It will be appreciated that in such a closed cycle system it is especially important to prevent mixing of the transfer liquid with the main liquid flow in the last stages of the two sections.

In order that the present invention may more readily be understood one embodiment thereof will now be described by way of example reference being made to the accompanying drawing which is a diagrammatic vertical cross-sectional representation showing three adjacent stages of an apparatus in accordance with the invention.

The apparatus shown forms part of a continuous closed system in which the resin is first used to treat a liquid and then the resin is regenerated. In the apparatus shown the three stages are a last liquid deionisation stage 100, a first resin regeneration stage 200, and an intermediate resin regeneration stage 300.

Each stage comprises an ion exchange column 101, 201 and 301 having a base section 102, 202 and 302 of inverted conical form and a cylindrical upper portion 103, 203 and 303. A support mesh 104, 204 and 304 is provided at the junction between the upper portion and base section of each of the columns. On each support mesh rests a bed of ion exchange resin 105, 205 and 305 having upper surfaces 106, 206 and 306 respectively. Near the top of each of the ion exchange columns there is provided an outlet conduit 107, 207 and 307, which form the liquid outlet means, whilst inlet conduits 108, 208 and 308 form the liquid inlet means and pass into the columns through the inverted conical base sections. Located just above each of the support meshes in each column is a narrow resin discharge tube 109, 209 and 309 respectively which pass out through the side walls of their respective ion exchange columns at a level which is less than the depth of the bed of resin. An inlet tube 110, 210 and 310 which forms the resin inlet means and is of the same internal diameter as the resin discharge tube passes into each column at a level which is also less than the depth of the resin bed and each of these tubes opens just above the surface of the resin bed in the column. The region of the column 111, 211 and 311 above the surface of the resin bed contains liquid which has passed through the bed, and the upper surface 112, 212 and 312 of this liquid is level with the opening to the outlet conduits.

Resin discharge tube 209 is connected to the inlet tube 110 by means of a connecting tube 1 and similarly tube 309 is connected to tube 210 by a connecting tube 2. The outlet conduit 207 is connected to the inlet conduit 308 by means of a linking conduit 3 and a pump 4. Resin discharge tube 109 is connected through a connecting tube 5 to an adjacent stage (not shown) and the inlet tube 310 is connected to another adjacent stage (not shown) by a connecting tube 6.

The inlet conduit 108 is connected to the outlet conduit of the next preceding stage of the deionisation section (not shown) and the outlet conduit 107 is connected to a collecting vessel (not shown) for the product liquid. The inlet conduit 208 is connected to a supply vessel containing a resin regenerating liquid (not shown) and outlet conduit 307 is connected to the inlet conduit of the next subsequent stage.

In stage 100 there is provided a means for preventing liquid passing from the tube 110 being mixed with the product liquid passing out of the column 101 through the conduit 107. This means comprises a vertical tube 113, the lower end of which is below the resin bed surface 106 and the upper end of which extends above the liquid surface 112. The inlet tube 110 joins the tube 113 at a point 114 which is just above the resin surface 106. A waste outflow tube 115 leads from the tube 113 at a point which is level with the opening to the liquid outlet conduit 107. A pitot head 116 is located in the tube 113 in a position between the point 114 and the lower end of tube 113. A connecting pipe 117 joins the pitot head to a measuring and control apparatus 118. This apparatus includes means for measuring a pressure differential in the pitot head and suitable relay means which is set to operate when the measured pressure differential falls outside preset limits.

The control means also includes a weir gate 119 which is operated by a lifting motor 120. The lifting motor 120 is itself connected by a line 121 to the relay means of the apparatus 118.

It will be appreciated that the complete apparatus of which only part is shown in the drawing will comprise two sections, a liquid treatment section and a resin regeneration section and that the part shown and described herein comprises one of the two junctions between the two sections in which the resin having been regenerated in sections 200, 300 etc. is passed to stage 100 at the end of the liquid treatment section. There will be a similar arrangement of stages at the junction where resin passes from the liquid treatment section to the resin regeneration section. Any remaining stages of the apparatus will be intermediate stages, of which stage 300 is typical. It will be appreciated that the simplest form of closed cycle apparatus will comprise two stages, one in each section.

The present invention will now be further described by way of reference to the described apparatus as used in the treatment of hard water. In such a case the resin used could be the type known as Permutit. The regenerating liquid in such a case would be strong sodium chloride solution.

The sodium chloride solution is passed into stage 200 through inlet conduit 208 at a rate which is just sufficient to cause fluidisation of the resin bed 205. As the solution passes through the resin, sodium ions pass from solution onto the resin and replace the calcium ions remaining on the resin in the known manner. The solution, now containing a small concentration of calcium ions passes through the region 211, and through conduits 207 and 3 to the pump 4 from which it is passed through the conduit 308 at a rate sufficient to cause fluidisation of the bed 305.

The resin in the regeneration sections has a higher sodium content at the bottom of the bed than at the top and the sodium content of the resin at the bottom of one bed e.g. 305 is about the same as the sodium content of the resin at the top of the bed, e.g. 205, in the next preceding stage.

A small quantity of resin is contained in the discharge and inlet tubes and the connecting tubes and fluidisation of the resin beds results in expansion of the bed in the tube which thus rises out of the inlet tubes and falls onto the top of the resin bed. Thus, the resin passes from inlet tube 310 to the top of bed 305 from whence it passes to the bottom of bed 305 and thence through tubes 309, 2 and 210 to the top of bed 205.

A small quantity of solution also passes through the resin tubes and in stages 200 and 300 this liquid mixes with the solution passing from bed 205 and 305 respectively and is returned with this solution to the stage from which it came. In stage 100, mixing of the sodium chloride solution from stage 200 with the soft water product passing out of the bed 105 is prevented by the pitot head 116, weir gate 119 and the associated apparatus.

In stage 100, essentially soft water from the preceding stage passes through inlet conduit 108 to cause fluidisation of the bed 105 in which the remaining calcium ions exchange with sodium ions of the resin. The soft water product passes out of the column 102 over the weir gate 119 and into the conduit 107. The height at which the weir gate 119 is set is determined by the pressure differential registered by the pitot head 116. This pressure differential is dependent on the net flow of liquid in the region of the bed surface 106. The apparatus 118 is set to ensure that a net upward flow of liquid occurs across the surface 106. Thus, sodium chloride solution passing, with resin particles into tube 113 at the point 114 passes upwardly through the tube and out through the outflow tube 115, whilst the resin particles fall to the resin bed surface 106, since the upward liquid flow may be controlled to be less than the fluidisation velocity of the particles.

If the net liquid flow as measured by the pitot head 116 is outside the pre-set limits, relay means within the apparatus 118 causes the motor 120 to raise or lower the weir gate 119 according to whether the net upward flow is too small or too great.

The liquid passing through the outlet tube is a solution containing dissolved sodium chloride and also sodium salts, e.g. sodium carbonate and sodium sulphate, from the soft water product which flows past the pitot head 116. This solution could be combined with the regenerating liquid in conduit 208 but is preferably rejected as waste.

Possible variations in the apparatus described include a resin wash section between stages 100 and 200 and a separate feed of sodium chloride solution to each of the regeneration stages 200, 300, etc.

In an experiment to show that expansion due to the wall effect occurs, a narrow tube having an internal diameter of about 5 mm. was placed in a bed of resin particles having a size range of 0.295 mm. to 1.204 mm. The bed was about 7.5 cm. in depth and was contained in a column having a large diameter relative to the particle size of the resin. Water was passed into the bed to give a flow rate in the bed of 0.06 cm./second, which was just sufficient to cause fluidisation of the bed in the column. It was observed that the part of the bed within the narrow tube was expanded relative to the bed in the column, and the height of the bed in the tube was about 10% greater than the height of the bed in the column.

It will be appreciated that the depth of the bed within the narrow tube relative to the depth of the bed in the column will be dependent primarily on the diameters of the tube and the column relative to the particle size of the resin and that with liquid flow rates close to the fluidisation velocity, the liquid flow rate will have only a small effect on the relative depths of the two beds. With liquid flow rates considerably in excess of the fluidising velocity, the effect of the liquid flow rate on the relative bed depths will be appreciable and at high flow rates the bed will tend to be fully expanded and of the same depth.

I claim:

1. A single stage for an ion exchange apparatus in which particles of an ion exchange resin move countercurrent to a liquid flow, such stage comprising an ion exchange column, a liquid inlet means located at the bottom of the column, a liquid outlet means located in the upper portion of the column, at least one narrow resin discharge tube located within the column and extending upwardly from near the base of the column, such resin discharge tube passing out of the column at a position below the top of a fluidised resin bed contained within the column, and resin inlet means in the form of a tube which terminates at a position slightly above the top of the resin bed.

2. The single stage of claim 1 including a pump connected to the liquid inlet means.

3. The single stage of claim 1 including a resin supporting mesh located near the bottom of the ion-exchange column.

4. The single stage of claim 1 wherein the resin discharge tube and the resin inlet means have an internal diameter which is 5–10 times the mean size of resin particles in a resin bed contained in the ion-exchange column, and the internal diameter of the column is at least 100 times the mean size of the resin particles.

5. Apparatus for effecting a continuous ion exchange process including a first stage and a last stage, each stage of the apparatus comprising an ion exchange column, a liquid inlet means located at the base of said column, a liquid outlet means, located in the upper portion of said column, at least one narrow resin discharge tube located within the column and passing upwardly from near the base of the column and out of the column at a position below the upper surface of a resin bed contained in the column and at least one resin inlet means passing in an upward direction into the column and opening just above the upper surface of the resin bed, means connecting the liquid inlet means of the first stage to a supply of liquid, a liquid pump, means connecting the liquid outlet means of the first stage to the liquid inlet means of the last stage through said liquid pump, means connecting the resin discharge tube of the first stage to a resin container, means connecting the resin inlet means of the first stage to the resin discharge tube of the last stage, means connecting the liquid outlet means of the last stage to a liquid container and means connecting the resin inlet means of the last stage to a resin supply vessel.

6. The apparatus of claim 5 wherein the means connecting the first and last stages includes at least one intermediate stage which is substantially the same as the first and last stages, and whereof the liquid inlet means and the resin discharge tube are connected respectively to the liquid outlet means and the resin inlet means of the next preceding stage and the liquid outlet means and the resin inlet means of such intermediate stage are connected respectively to the liquid inlet means and the resin discharge tube of the next subsequent stage.

7. Apparatus for effecting a continuous ion exchange process including a closed cycle for resin flow and comprising a liquid treatment section and a resin regenerating section, each of said sections comprising substantially the apparatus of claim 5 wherein the resin discharge tube of the first stage of the resin regenerating section is connected to the resin inlet means of the last stage of the liquid treatment section and the resin inlet means of the last stage of the resin regenerating section is connected to the resin discharge tube of the first stage of the liquid treatment section.

8. The apparatus of claim 7 including flow control means in the last stage of the liquid treatment section and in the last stage of the resin regeneration section.

9. The apparatus of claim 8 wherein said flow control means comprises an essentially vertical tube which is located within the ion exchange column, the end of the resin inlet means is connected to said vertical tube, the lower end of said vertical tube is below the upper surface of a resin bed in said ion exchange column, the upper end of said vertical tube passes out from the top of the ion exchange column, a flow sensitive device is positioned in said vertical tube in the region of the upper surface of the resin bed, a liquid outflow means is connected to said vertical tube at a position which is level with the liquid outlet means from the ion exchange column, a flow restricting means is positioned at the liquid outlet means, and the flow restricting means is operatively connected to the flow sensitive device.

10. The apparatus of claim 9 wherein the flow sensitive means is a pitot and the flow restricting means is a variable weir.

11. A process for ion exchange comprising the steps of setting up a plurality of ion exchange columns, placing particles of an ion exchange resin into each of said columns to form a bed of such particles in each column, passing a liquid through each such column in turn at a rate sufficient to cause fluidisation of the resin bed therein, simultaneously effecting fluidisation and expansion of a restricted portion of the resin bed in each column and effecting a transfer of the said restricted portion to the resin bed of an adjacent column in counter current to the liquid flow.

References Cited

UNITED STATES PATENTS

| 2,850,438 | 9/1958 | Bodkin et al. | 23—310 X |
| 3,062,738 | 11/1962 | Read et al. | 210—33 X |
| 3,160,585 | 12/1964 | Emmett et al. | 210—33 X |
| 3,298,791 | 1/1967 | Meyer et al. | 23—270 |

SAMIH N. ZAHARNA, Primary Examiner.

U.S. Cl. X.R.

23—270; 210—33, 189